(12) United States Patent
Yamagishi et al.

(10) Patent No.: US 7,610,592 B2
(45) Date of Patent: Oct. 27, 2009

(54) PICKUP APPARATUS AND DISK APPARATUS INCLUDING THE PICKUP APPARATUS

(75) Inventors: Yasufumi Yamagishi, Saitama (JP); Toshio Enokido, Saitama (JP); Noboru Onojima, Gunma (JP)

(73) Assignee: Sanyo Electric Co., Ltd., Osaka (JP)

( * ) Notice: Subject to any disclaimer, the term of this patent is extended or adjusted under 35 U.S.C. 154(b) by 525 days.

(21) Appl. No.: 11/465,301

(22) Filed: Aug. 17, 2006

(65) Prior Publication Data

US 2007/0074235 A1 Mar. 29, 2007

(30) Foreign Application Priority Data

Sep. 12, 2005 (JP) ............................. 2005-263806

(51) Int. Cl.
*G11B 7/085* (2006.01)
(52) U.S. Cl. ...................................... 720/679
(58) Field of Classification Search ................ 720/679, 720/676, 671, 626, 695, 655
See application file for complete search history.

(56) References Cited

U.S. PATENT DOCUMENTS

| 6,108,143 | A | * | 8/2000 | Hirose et al. | ................. 359/819 |
| 7,012,768 | B2 | * | 3/2006 | Hirose et al. | ................. 359/822 |
| 2002/0135893 | A1 | * | 9/2002 | Hirose et al. | ................. 359/819 |
| 2003/0218964 | A1 | * | 11/2003 | Kurita et al. | ................. 369/249 |
| 2004/0057373 | A1 | * | 3/2004 | Hoshinaka et al. | .......... 369/223 |
| 2006/0174254 | A1 | * | 8/2006 | Takasawa et al. | ........... 720/676 |

FOREIGN PATENT DOCUMENTS

JP 2001-344777 12/2001

* cited by examiner

*Primary Examiner*—Allen T Cao
(74) *Attorney, Agent, or Firm*—Fish & Richardson P.C.

(57) ABSTRACT

A pickup apparatus comprising a housing equipped with components for reading data on a medium, the housing being disposed with a bearing portion correspondingly to a shaft member supporting the housing movable, the bearing portion being disposed with a crack generation preventing portion that preventing the housing from becoming cracked when an impact is applied to the housing with the shaft member disposed in the bearing portion.

11 Claims, 9 Drawing Sheets

PICKUP APPARATUS AND DISK APPARATUS INCLUDING THE PICKUP APPARATUS

CROSS-REFERENCE TO RELATED APPLICATION

This application claims the benefit of priority to Japanese Patent Application No. 2005-263806, filed Sep. 12, 2003, of which full contents are incorporated herein by reference.

BACKGROUND ON THE INVENTION

1. Technical Field

The present invention relates to a pickup apparatus that can reproduce data recorded on a medium such as a disc or record data on a medium such as a disc, and a disc apparatus including the same.

2. Description of the Related Art

FIGS. 5, 6, 7, 8, and 9 show one form of a conventional pickup apparatus.

An optical pickup apparatus 501 (FIG. 5, FIG. 6) is used to reduce and record data such as information on a medium (not shown). The medium includes optical discs, for example, CD (Compact Disc) and DVD (Digital Versatile Disc) (not shown).

The optical pickup apparatus 501 is mounted on an optical disc apparatus (not shown) including a motor (not shown) that rotates an optical disc (not shown).

An objective lens 610 (FIG. 5) is disposed on a housing 601 constituting an optical pickup apparatus 501. The housing means, for example, a box-shaped object or a box-like object that houses apparatuses, components, etc. The housing 601 of the optical pickup apparatus 501 is supported movable by a first shaft 810 and a second shaft 820. The shafts 810, 820 are attached to a chassis (not shown). The chassis means a platform to which components are attached.

The first shaft 810 is movably inserted through bearing portions 511, 512 disposed on the housing 601 of the optical pickup apparatus 501. The second shaft 820 is movably disposed in a bearing portion 593 disposed on the housing 601 of the optical pickup apparatus 501. In this way, the housing 601 of the optical pickup apparatus 501 is guided and supported movably by the shafts 810, 820.

The housing 601 of the optical pickup apparatus 501 is moved along the direction to which the shafts 810, 820 are extended. As a result, the housing 601 of the optical pickup apparatus 501 is moved along the redial direction of the optical disc (not shown). The shafts 810, 820 are formed, for example, as guide shafts 810, 820 guiding and supporting the housing 601 of the optical pickup apparatus 501.

The chassis (not shown) is disposed with a feed motor (not shown) that can move the housing 601 of the optical pickup apparatus 501. A feed screw (not shown) is disposed on and extended from the feed motor (not shown). The feed screw (not shown) is disposed in substantially parallel to the shafts 810, 820. The feed screw (not shown) is disposed in parallel in the vicinity of the first shaft 810. The feed screw is disposed with a substantially spiral feed groove (not shown) that can move the housing 601. The feed screw is mounted on a support member (not shown) attached to the chassis. A transmitting member (not shown) in contact with the feed screw is mounted on the housing 601 of the optical pickup apparatus 501. The transmitting member (not shown) is disposed with an engaging portion (not shown) to be engaged with the feed groove of the feed screw (not shown).

By rotating the feed motor, the feed screw is rotated. This rotation presses and moves the engaging portion of the transmitting member engaged with the feed groove of the feed screw on the housing 601 side, and the housing 601 of the optical pickup apparatus 501 is moved along the direction to which the long shafts 810, 820 are extended. The housing 601 including the objective lens 610 of the optical pickup apparatus 501 is moved to record/reproduce data on the optical disc.

When recording/reproducing data on the optical disc, laser light emitted from a light emitting device (not shown) in the housing 601 of the optical pickup apparatus 501 passes through the objective lens 610 of the optical pickup apparatus 501 and is emitted to the outside of the optical pickup apparatus 501. The laser light condensed by the objective lens 610 is focused on a signal layer (not shown) of the optical disc.

Although other driving modes of the optical pickup apparatus (not shown) exist in addition to the driving mode moving the housing 601 of the optical pickup apparatus 501 with the use of the feed screw, the detailed description thereof is omitted here.

With regard to a conventional optical pickup apparatus, a lens driving apparatus and an optical pickup using the apparatus are known, which are small, less vibrated, and used in an optical recording/reproducing apparatus (e.g., Japanese Patent Application Laid-Open Publication No. 2001-344777, pages 1 and 3, FIGS. 1 to 7).

Recently, weight saving and miniaturization is required in the optical pickup apparatus 501 mounted on the optical disc apparatus by optical disc apparatus manufactures incorporating the optical pickup apparatus 501 into the optical disc apparatus and manufactures of computers including the optical pickup apparatuses 501. Therefore, an attempt has been considered to reduce the weight of the optical pickup apparatus 501 by changing from the metal housing 601 disposed with the various optical components 610 and the like to the resin housing 601. If the metal housing 601 is changed to the resin housing 601, the weight of the optical pickup apparatus 501 is reduced.

However, if he metal housing 601 is changed to the resin housing 601, lack of strength becomes problematic in the housing 601. For example, when the metal housing 601 is changed to the resin housing 601, the strength of the resin housing 601 may be deteriorated and the resin housing 601 may be cracked. Specifically, if the optical pickup apparatus 501 is dropped when the metal shafts 810, 820 are attached to the resin housing 601 and the resin housing 601 of the optical pickup apparatus 501 is affected by an impact, it is concerned that the bearing portions 501, 512 of the housing 601 locally contact the shaft 810 (FIG. 8, FIG. 9), resulting in a crack in the resin housing 601. The "crack" means a "break" or "breach".

The optical disc apparatus manufactures incorporating the optical pickup apparatuses 501 into the optical disc apparatus and the manufacturers of computers including the optical pickup apparatuses 501 have requested provision of the optical pickup apparatus 501 that does not create problems even if the optical pickup apparatus 501 is subject to a certain level of vibration or impact when transported.

SUMMARY OF THE INVENTION

To solve the above problems, a major aspect of the present invention provides a pickup apparatus comprising a housing equipped with components for reading data on a medium, the housing being disposed with a bearing portion correspondingly to a shaft member supporting the housing movably, the bearing portion being disposed with a crack generation preventing portion that prevents the housing from becoming cracked when an impact is applied to the housing with the shaft member disposed in the bearing portion. With this configuration, a problem is prevented more easily that a crack is generated in the housing. The crack means a break or breach. The housing means, for example, a box-shaped object or a box-like object that houses apparatuses, components, etc, Since the bearing portion of the housing is disposed with the crack generation preventing portion, when an impact is applied to the portion of the housing, for example, it can be avoided more easily that the impact is transmitted through the shaft member to the bearing portion of the housing as a consequence to cause the housing to have a crack beginning at the bearing portion. Therefore, the pickup apparatus with the crack-resistant housing can be provided.

In the pickup apparatus according to the present invention, the crack generation preventing portion includes a notch portion bored deeply toward an interior of the bearing portion. With this configuration, it can be avoided more easily that a crack is generated from the bearing portion of the housing. Since the notch portion for preventing crack generation is bored in the bearing portion deeply toward the interior of the bearing portion, when an impact is applied to the shaft member with disposed in the bearing portion of the housing, for example, the shaft member contacts a deep part of the interior of the bearing portion. Therefore, when an impact is transmitted through the shaft member to the bearing portion of the housing, for example, it can be avoided more easily that the shaft member locally contact the opening of the bearing portion of the housing which results in a crack of the housing from the opening of the bearing portion.

In the pickup apparatus according to the present invention, the crack generation preventing portion includes a notch portion in a substantially conical shape which is bored while being narrow toward an interior of the bearing portion. With this configuration, it can be avoided more easily that a crack is generated from the bearing portion of the housing. Since the notch portion for preventing crack generation in a substantially conical shape which is narrowed toward the interior of the bearing portion the housing, is bored in the bearing portion of the housing, for example, when an impact is applied to the shaft member with disposed in the bearing portion of the housing, it can be avoided more easily that the shaft member locally contacts the bearing portion of the housing to make the impact force concentrated on a portion of the bearing portion of the housing extraordinarily. Therefore, the problem of the crack generated from the bearing portion of the housing can be prevented more easily.

In the pickup apparatus according to the present invention, the crack generation preventing portion includes a notch portion in a substantially conical shape which is bored while being narrowed toward an interior of the bearing portion; the bearing portion includes the notch portion and a shaft slide contacting portion in a substantially cylindrical shape following the notch portion and contacting the shape member; and an inclined surface of the notch portion is set to form an obtuse angle relative to an internal of the shaft slide contacting portion and the inclined surface is broadened toward an opening of the bearing portion. With this configuration, it can be avoided more easily that a crack is generated in the opening of the bearing portion of the housing. An obtuse angle means an angle larger than the right angle and smaller than the straight angle. Since the inclined surface of the notch portion for preventing crack generation in a substantially conical shape is set to form am obtuse angle relative to the internal surface of the shaft slide contacting portion of the bearing portion and the inclined surface of the notch portion for preventing crack generation is broadened toward the opening of the bearing portion, when an impact is applied to the shaft member with disposed in the bearing portion of the housing, for example, it can be avoided more easily that the shaft member locally contacts the opening of the bearing portion of the housing to make the impact force concentrated on the opening of the bearing portion of the housing extraordinarily. Therefore, the problem of the crack generated in the housing form the opening of the bearing portion can be prevented more easily.

In the pickup apparatus according to the present invention, the crack generation preventing portion includes a notch portion bored deeply form opening of the bearing portion to an interior of the bearing portion, and when the shaft member is inserted in the bearing portion, clearance is formed between the bearing portion and the shaft member and a depth dimension of the notch portion is set greater than a clearance dimension between the bearing portion and the shaft member. With this configuration, it can be avoided more easily that a crack is generated from the opening of the bearing portion of the housing. Since the depth dimension of the notch portion for preventing crack generation disposed in the bearing portion of the housing is set greater than the clearance dimension between the bearing portion and the shaft member, when an impact is applied to the shaft member with disposed in the bearing portion of the housing. for example, the shaft member contacts a relatively deep part of the interior of the bearing portion. Since the shaft member contacts a relatively deep part of the interior of the bearing portion, when an impact is transmitted through the shaft member to the bearing portion of the housing, a problem is prevented more easily that the shaft member, for example, locally contacts the opening of the bearing portion of the housing which results in a crack of the housing from the opening of the bearing portion.

In the pickup apparatus according to the present invention, the crack generation preventing portion is disposed with a stress alleviating portion that, when an impact is applied to the housing including the shaft member, alleviates an impact force to be received by the bearing portion by virtue of the shaft member's hitting against the bearing portion. With this configuration, a problem can be avoided more easily that a crack is generated in the housing. For example, when an impact is applied to the shaft member with disposed in the bearing portion of the housing, even if the impact is transmitted through the shaft member to the bearing portion of the housing, the impact is alleviated by the stress alleviating portion for preventing crack generation disposed in the bearing portion if the housing. Therefore, a problem can be prevented more easily that the impact is transmitted through the shaft member to the bearing portion of the housing which results in a crack of the housing from the bearing portion.

In the pickup apparatus according to the present invention, the crack generation preventing portion includes a notch portion in a substantially conical shape which is formed to be narrowed toward an interior of the bearing portion in a substantially round hole shape, and between the notch portion in a substantially conical shape and the shaft slide contacting portion in a substantially cylindrical shape following the notch portion and contacting the shaft member, is disposed a stress alleviating portion that, when an impact is applied to the housing including shaft member in a substantially round bar shape, alleviates an impact force to be received by the bearing portion by virtue of the shaft member's hitting against the bearing portion. With this configuration, a problem can be avoided more easily that a crack is generated in the housing. For example, when an impact is applied to the shaft member in a substantially round bar shape with disposed in the bearing portion in a substantially round hole shape of the housing, even if the impact is transmitted through the shaft member to the bearing portion of the housing, the impact is alleviated by the stress alleviating portion for crack generation preventing crack generation disposed in the bearing portion of the housing. The impact received by the shaft member is reduced by the stress alleviating portion for preventing clack generation between the notch portion in a substantially conical shape disposed in the bearing portion in a substantially round hole shape of the housing and the shaft contacting portion in a substantially cylindrical shape following the notch portion and contacting the shaft member in a substantially round bar shape. Therefore, the hearing portion of the housing becomes harder to be cracked.

In the pickup apparatus according to the invention, the stress alleviating portion is formed as a curved surface. With this configuration, a problem can be avoided more easily that the crack is generated in the housing, If the stress alleviating portion is formed in the bearing portion as the curved surface to alleviate the impact force to be received by the bearing portion by virtue of the shaft member's hitting against the bearing portion, stress concentration is hard to be generated in the bearing portion. The stress concentration means a state of highly localized stress distribution, for example. Since the stress concentration can be avoided more easily in the bearing portion, the crack beginning at the bearing portion of the housing can be avoided more easily.

In the pickup apparatus according to the present invention, a pair of the bearing portion is disposed on the housing and the crack generation preventing portions are formed on both outside portions of a pair of the bearing portions adjacent to each other. With this configuration, the crack beginning at the bearing portion of the housing is avoided more easily. For example, when an impact is applied to the shaft member with disposed in a pair of the bearing portions of the housing, the shaft member may be bent considerably for a moment. In this case, it is concerned that the shaft member may contact the openings of the bearing portion disposed in the both outside portions of a pair of the adjacent bearing portions. If a pair of the bearing portions is disposed on the housing, the impact transmitted through the shaft member to the housing disperses to a pair of the bearing portions. If the crack generation preventing portions are formed on the both outside portions of a pair of the adjacent bearing portions, the generation of the crack is avoided more easily which begins at one or both of the outside portions of a pair of the bearing portions. Therefore, the housing constituting the pickup apparatus becomes hard to be cracked.

In the pickup apparatus according to the present invention, the shaft member is formed into a substantially round bar shape, the bearing portion is formed into a substantially round hole shape to have an opening in a substantially round shape; the crack generation preventing portion includes a notch portion formed from the opening of the bearing portion to an interior of the bearing portion; the opening of the bearing portion is formed to serve also as an opening of the notch portion; and when the shaft member is disposed in the bearing portion, a surface of the shaft member does not contact the opening. With this configuration, it is avoided that the opening of the bearing portions of the housing serve as a beginning point of a crack and that the housing is cracked from the opening of the bearing portions. When the shaft member is disposed in the bearing portions of the housing, The surface of the shaft member does not contact the opening of the notch portions disposed in the bearing portions and, therefore, when an impact is transmitted through the shaft member to the housing, it is avoided that the housing is cracked from the opening of the bearing portions of the housing. For example, when an impact is applied to the shaft member with the shaft member disposed in the bearing portions of the housing, it is avoided that the impact is transmitted through the shaft member to the openings of the bearing portions of the housing to generate a crack in the housing beginning at the opening of the bearing portions.

In the pickup apparatus according to the present invention, the housing is made of a resin material. With this configuration, the pickup apparatus is configured with the housing having a lighter weight. In general, a specific gravity of resin material is smaller than that of metal material. Therefore, the weight of the housing can be reduced by forming the housing with the use of a resin material. Since the crack generation preventing portion are disposed in the bearing portions of the resin housing. It can be avoided more easily that the housing is cracked form the bearing portions. Therefore, the pickup apparatus can be provided that includes the resin housing with a lighter weight, which is hard to be cracked form the bearing portions.

In a disc apparatus according to the present invention comprises the pickup apparatus according to the present invention. With this configuration, the disc apparatus is configured with the pickup apparatus which takes measures against the crack of the housing. When an impact is applied to the disc apparatus, the problem of the crack can be prevented more easily in the housing of the pickup apparatus included in the disc apparatus. Therefore, the disc apparatus including the impact-resistant pickup apparatus can be provided.

BRIEF DESCRIPTION OF THE DRAWINGS

To understand the present invention and the advantages thereof more thoroughly, the following description should be referenced in conjunction with the accompanying drawings.

DETAILED DESCRIPTION OF THE INVENTION

From the contents of the description and the accompanying drawings, at least the following details will become apparent.

Description will hereinafter be made of an embodiment of a pickup apparatus and a disc apparatus including the same according to the present invention.

Figure 1:
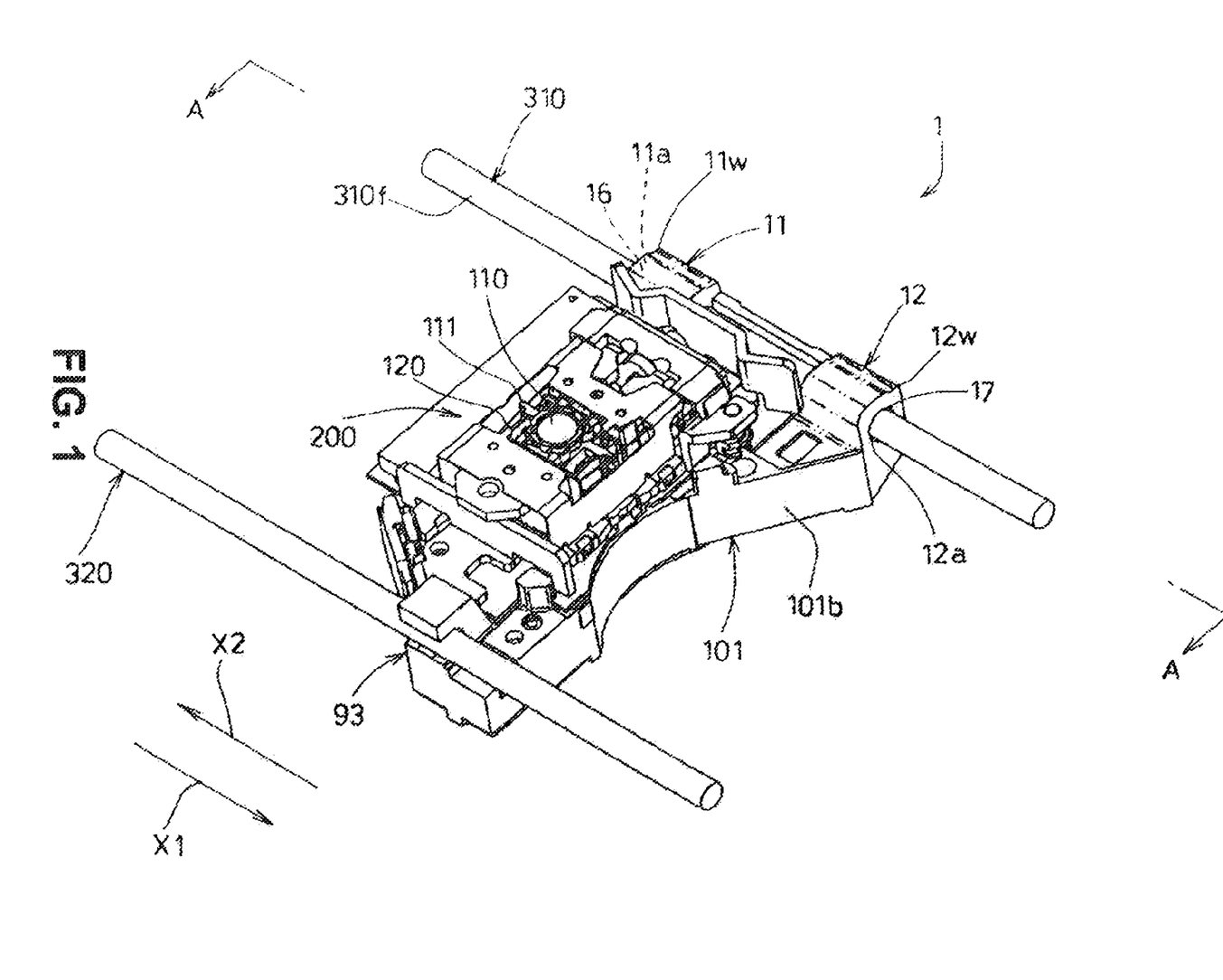
FIG. 1 is a perspective view of a first embodiment of a pickup apparatus and a disc apparatus including the same according to the present invention.
Figure 2:
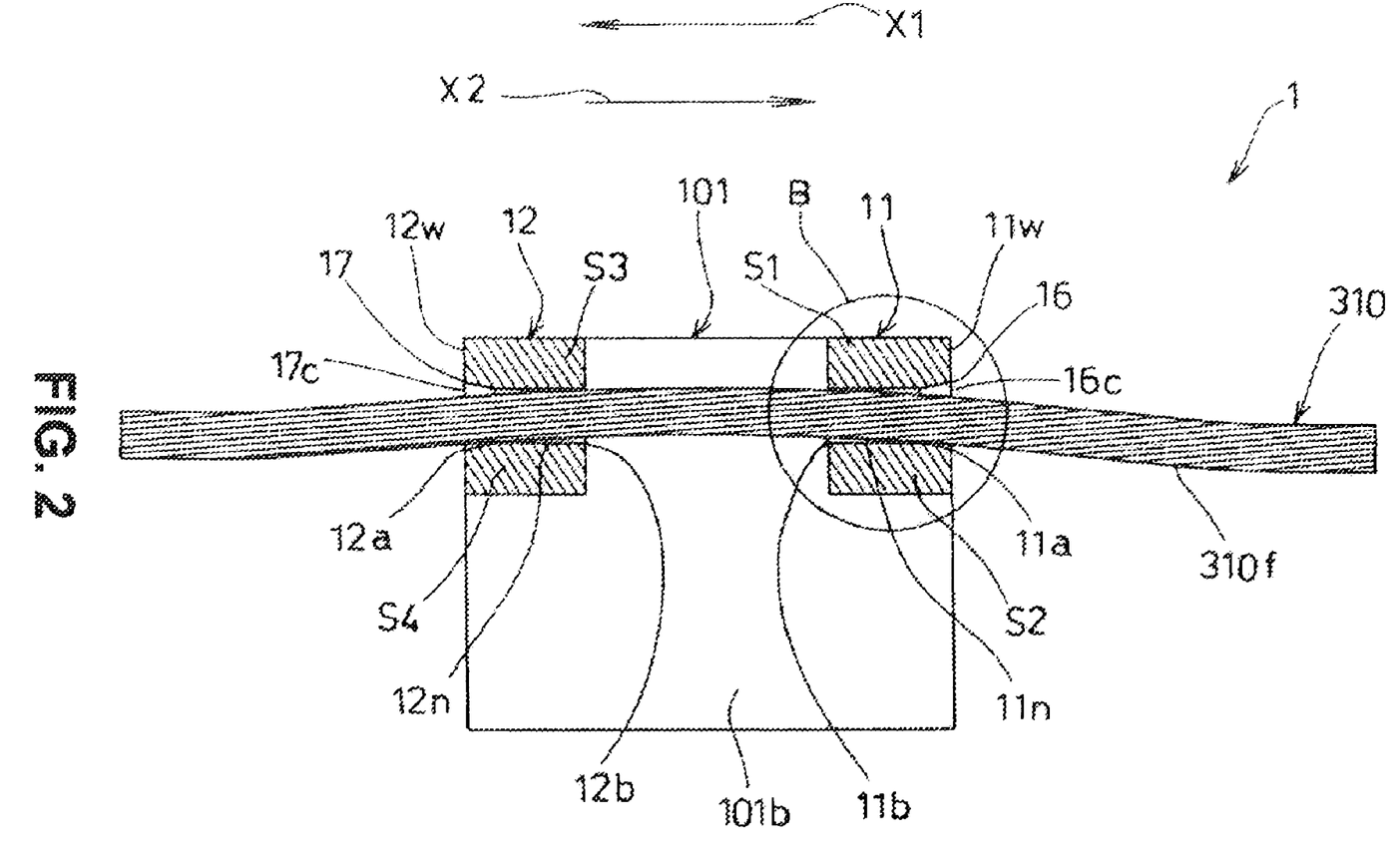
FIG. 2 is a cross-section diagram of a state when a shaft member mounted on the pickup apparatus is deformed.
Figure 3:
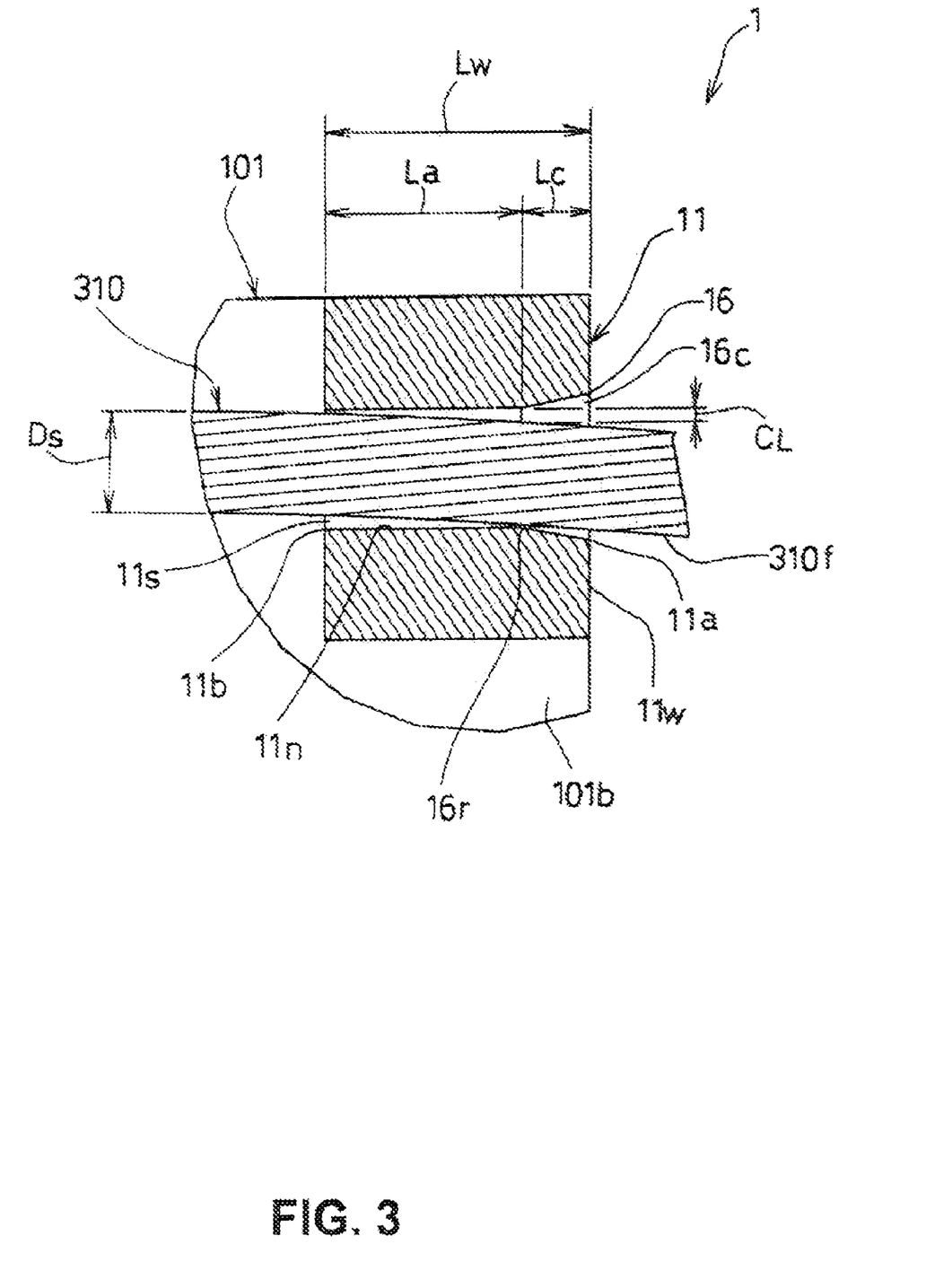
FIG. 3 is an enlarge diagram of a B-portion of FIG. 2.
Figure 4:
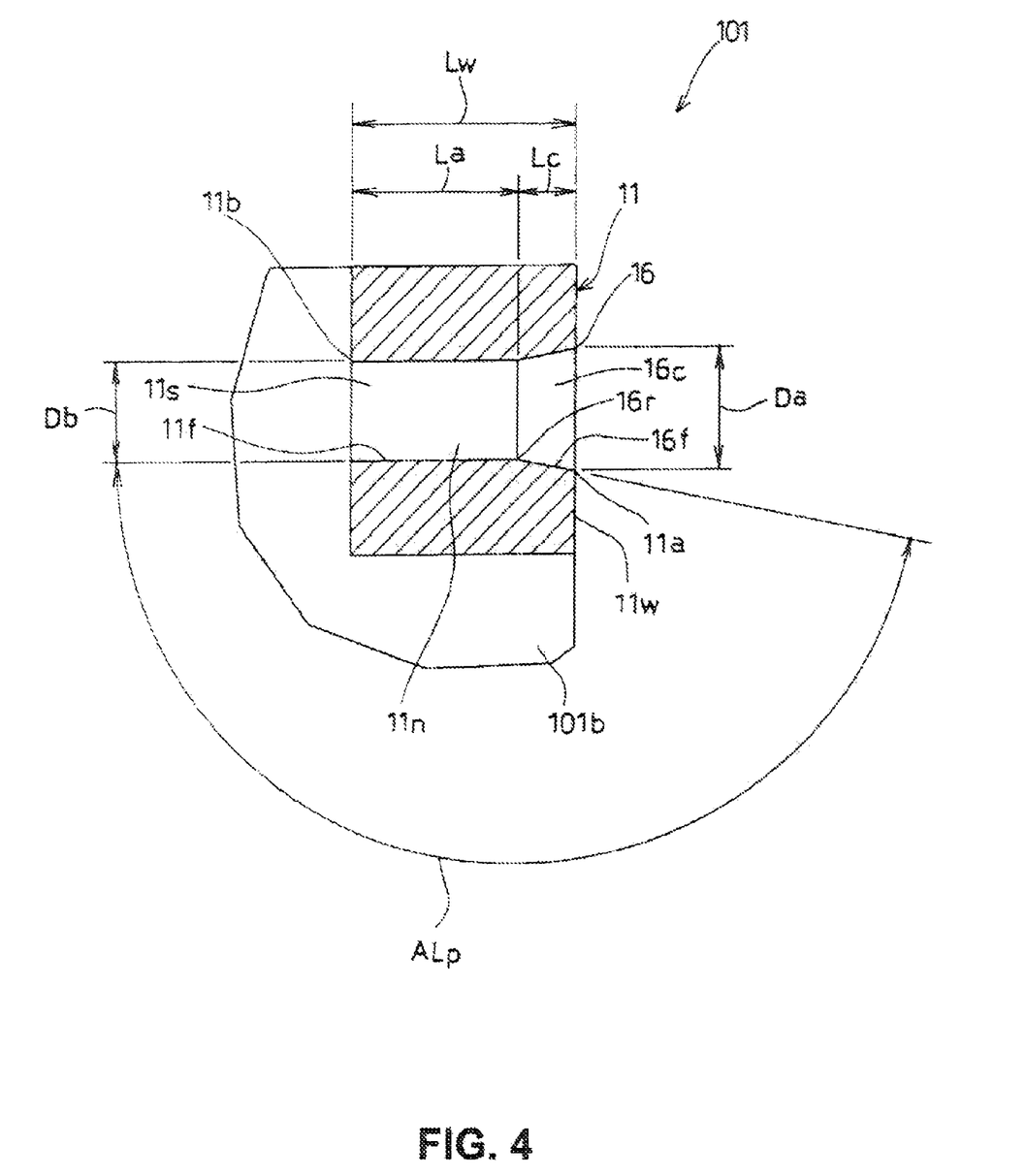
FIG. 4 is an enlarge cross-section diagram of a first embodiment of a housing of the pickup apparatus.
Figure 5:
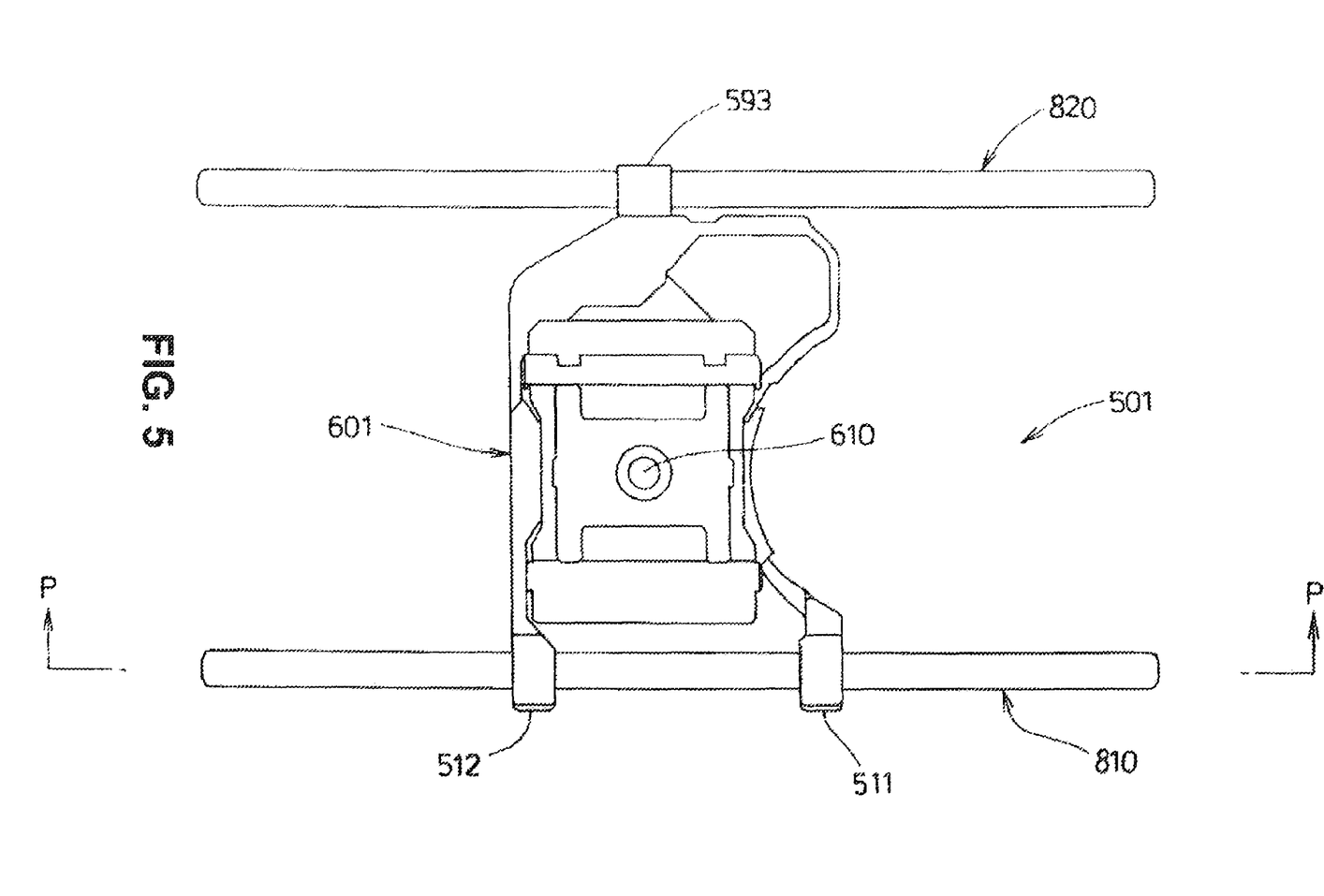
FIG. 5 is a plan view of one embodiment of a conventional pickup apparatus.
Figure 6:
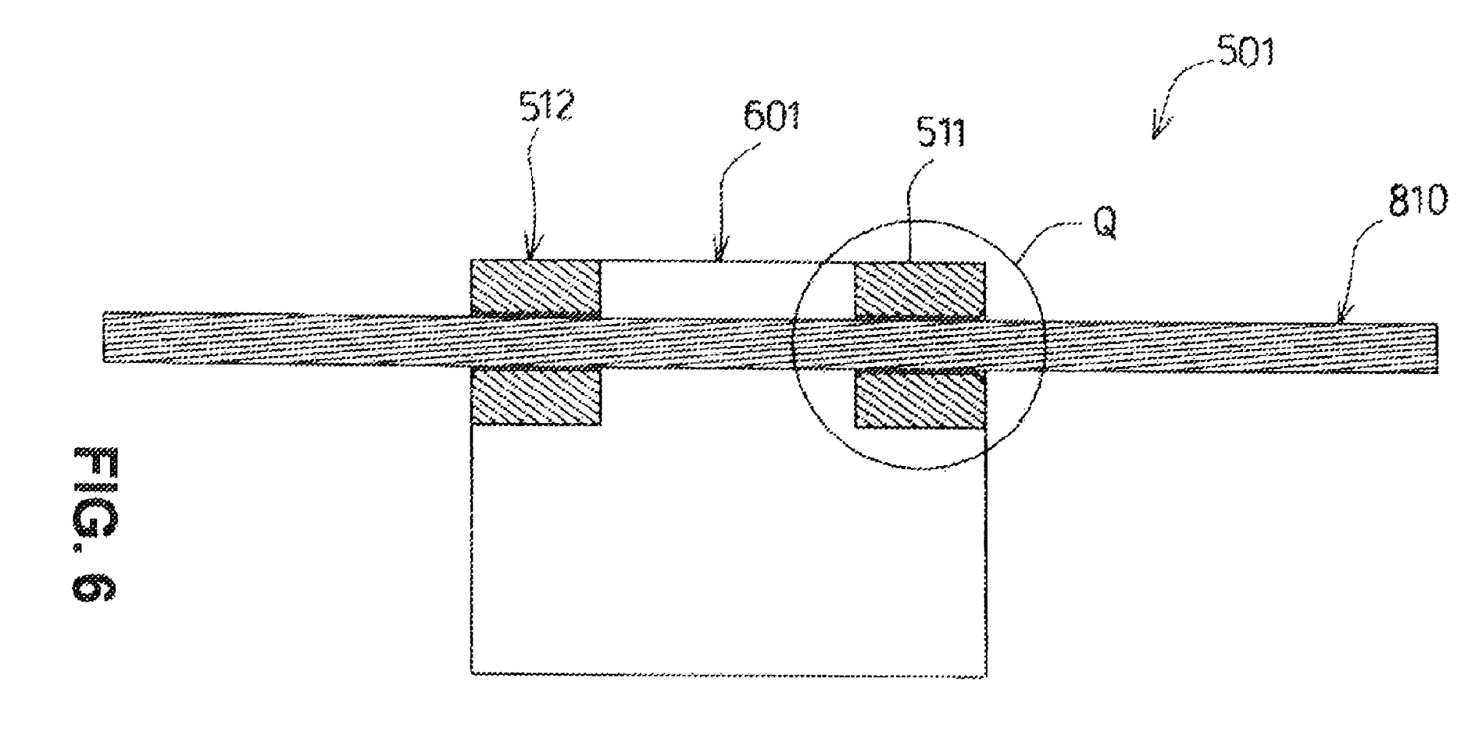
FIG. 6 is a P-P cross-section diagram of FIG. 5.
Figure 7:
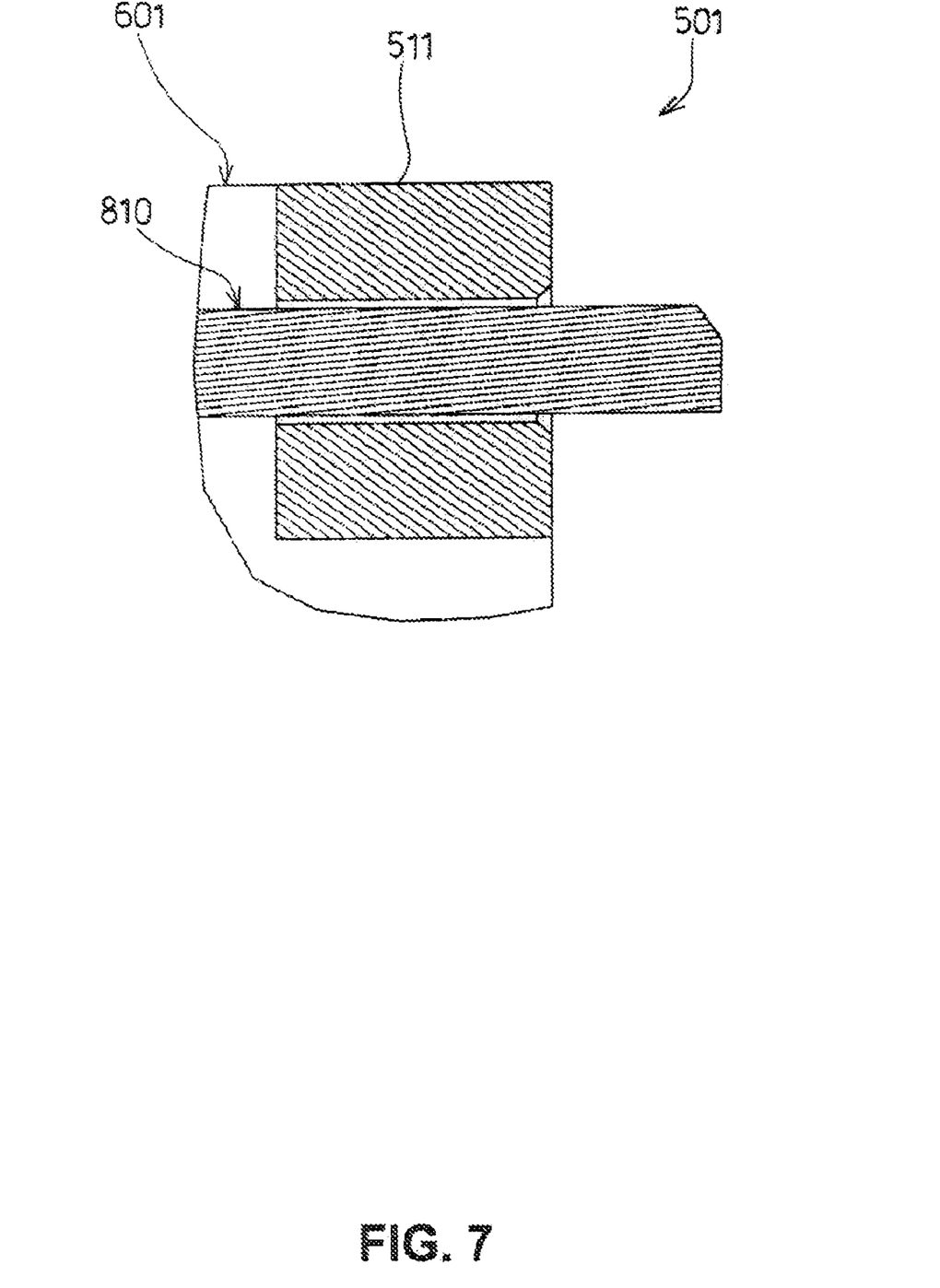
FIG. 7 is an enlarge diagram of a Q-portion of FIG. 6.
Figure 8:
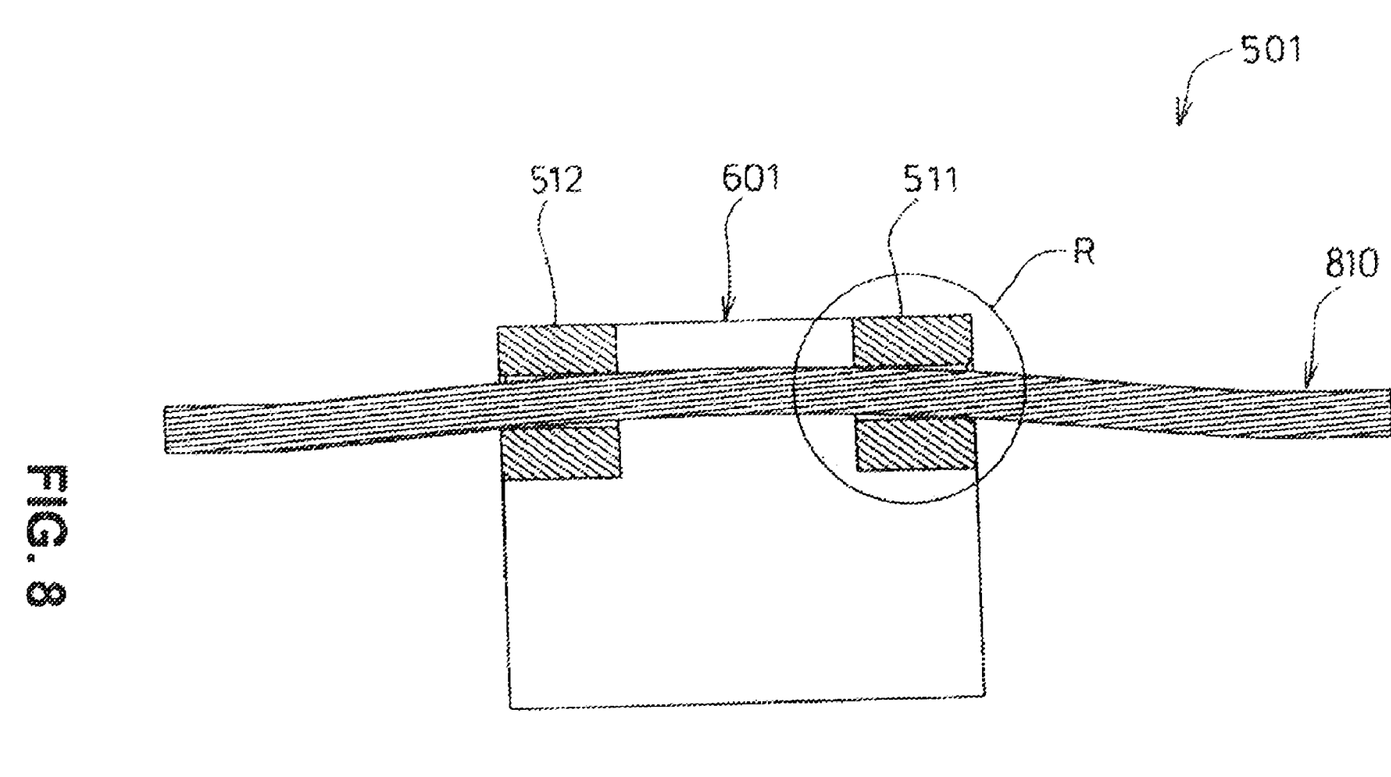
FIG. 8 is a cross-section diagram of a state when a shaft member mounted on the pickup apparatus is deformed.
Figure 9:
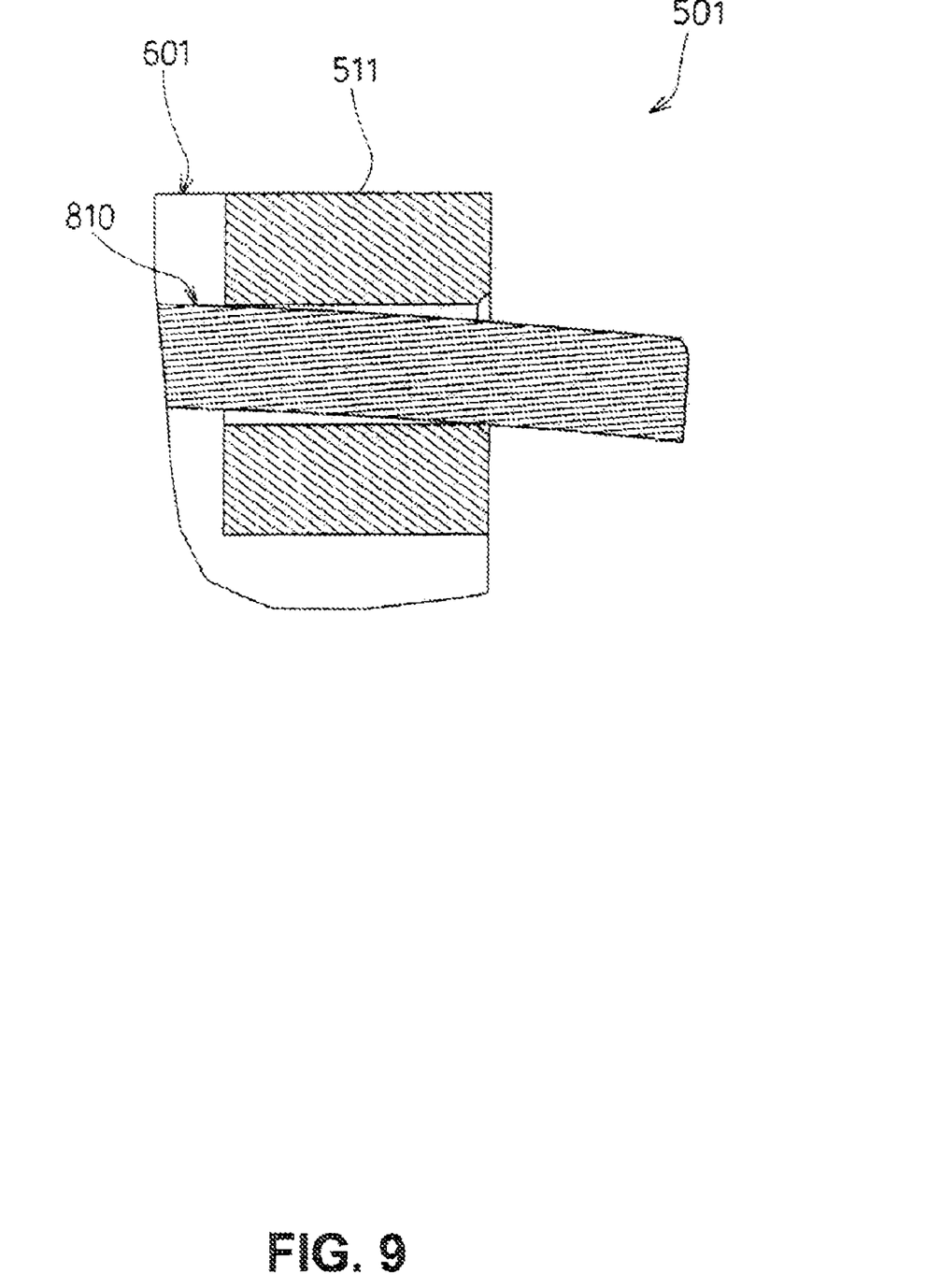
FIG. 9 is an enlarge diagram of an R-portion of FIG. 8.

FIG. 1 is a perspective view of a first embodiment of a pickup apparatus and a disc apparatus including the same according to the present invention; FIG. 2 is a cross-section diagram of a state when a shaft member mounted on the pickup apparatus is deformed; FIG. 3 is an enlarged diagram of a B-portion of FIG. 2; and FIG. 4 is an enlarge cross-section diagram of a first embodiment of a housing of the pickup apparatus.

FIG. 2 is a cross-section diagram of a state when a shaft member is affected by an impact, which generates elastic deformation in the shaft member, in an A-A cross-selection diagram of FIG. 1.

The optical apparatus 1 (FIG. 1, FIG. 2) is used to reproduce or record data such as information on a medium (not shown). The medium includes, for example, an optical disc in the CD series and an optical disc in the DVD series )not shown). "CD" is an abbreviation of "Compact Disc" (trademark). "DVD" is an abbreviation of "Digital Versatile Disc" (registered trade mark).

The optical pickup apparatus 1 (FIG. 1, FIG. 2) is used to reproduce or record data such as information on a medium (not shown). The medium includes, for example, an optical disc in the Cd (Compact Disc) (trademark) series and an optical disc in the DVD (Digital Versatile Disc) (registered trade mark) series (not shown).

Describing the disc specifically, the disc includes, for example, a data read only optical disc such as "CD-ROM" and "DVD-ROM",a data recordable optical disc such as "CD-R", "DVD-R", and "DVD+R", a data writable/erasable or data rewritable optical disc such as "CD-RW", "DVD-RW", "DVD+RW" (registered trademark), "DVD-RAM", "HD DVD" (registered trademark), and "Blu-ray Disc" (trademark), etc.

"ROM" of the "CD-ROM" or "DVD-ROM" is an abbreviation of "Read Only Memory ". The "CD-ROM" or "DVD-ROM" is data/information read only. "R" of the "CD-R", "DVD-R", or "DVD+R" is an abbreviation of "Recordable". The "CD-R", "DVD-R", or "DVD+R" is data/information recordable. "RW" of the "CD-RW", "DVD-RW", or "DVD+RW" is an abbreviation of "Re-Writable". The "CD-RW", "DVD-RW", or "DVD+RW" is data/information rewritable. The "DVD-RAM" is an abbreviation of "Digital Versatile Disc Random Access Memory". The "DVD-RAM" is data/information writable/erasable.

The "HD DVD" is an abbreviation of "High Definition DVD". The "HD DVD" has a compatibility with the conventional DVD series and has a storage capacity larger than the conventional DVD series. The infrared laser has been used in the conventional CD. The red laser has been used in the conventional DVD. However, when reading data/information recorded in "HD DVD" optical discs, the blue-violet laser is used. The "Bla-ray" means the blue-violet laser employed for achieving higher-density recording than the red laser that is used to read or write conventional signals.

The optical discs include an optical disc (not shown) disposed with signal surfaces on the both disc sides that can write/erase data or rewrite data. The optical discs include an optical disc (not shown) disposed with a two-layered signal surface that can write/erase data or rewrite data. The optical discs include an "HD-DVD" optical disc (not shown) disposed with a three-layered signal surface that can write/erase data or rewrite data. The optical discs include a "Blu-ray" optical disc (not shown) disposed with a four-layered signal surface that can write/erase data or rewrite data.

The optical apparatus 1 is used when reproducing data recorded on the various optical discs and when recording data on the various writable or rewritable optical discs. The optical apparatus 1 supports a CD series medium such as CD-ROM, CD-R, and CD-RW and a DVD series medium such as DVD-ROM, DVD±R, DVD±RW, RVR-RAM, and ND-DVD. This optical pickup apparatus 1 can support a plurality of types of media.

The optical pickup apparatus 1 (FIG. 1, FIG. 2) can support various optical discs such as a data read only optical disc and a data recordable optical disc and is mounted on an optical disc apparatus (not shown) including a motor (not shown)

A spindle motor (not shown) is attached to a metal/synthetic resin chassis (not shown) constituting the optical disc apparatus. As described above, the chassis means a platform to which components are attached. A turntable (not shown) to be disposed with the optical disc (not shown) is pressed and fixed to a rotary shaft (not shown) of the spindle motor (not shown).

A synthetic resin housing 101 constituting the optical pickup apparatus 1 is disposed with a synthetic resin lens holder 111 including a synthetic resin/glass objective lens 110 (FIG. 1). As described above, the "housing" means, for example, a box-shaped object or a box-like object that houses apparatuses, components, etc. The objective lens 110, etc., are considered as important optical system components in the optical pickup apparatus 1. The lens holder 111 including the objective lens 110 is supported movably by a plurality of suspension wires 120. The housing 101 of the optical pickup apparatus 1 is supported movably by substantially cylindrical-column shaped metal first shaft memory 310 and a substantially cylindrical-column-shaped metal second member 320. A pair of shaft member 310, 320 is attached to the chassis (not shown).

The housing 101 of the optical pickup apparatus 1 is supported movably by the substantially cylindrical-column-shaped metal first member 310 and the substantially cylindrical-column-shaped metal second shaft member 320. The substantially round-bar-shaped long shaft member 310, 320 or so-called shafts 310, 320 are attached to the chassis (not shown). The optical disc apparatus (not shown) is constituted by mounted a pair of shaft 310, 320 on the optical pickup apparatus 1 and mounting the pair of shaft 310, 320 on the chassis (not shown).

The metal cylindrical-column-shaped first shaft 310 is inserted movably through a pair of synthetic resin cylindrical-shaped slide bearing portions 11, 12 disposed on the housing 101 of the optical pickup apparatus 1. The metal cylindrical-column-shaped second shaft 310 is mounted movably on a synthetic resin projecting slide bearing portion 93 disposed on the housing 101 of the optical pickup apparatus 1. In this way, the housing 101 of the optical pickup apparatus 1 is guided and supported movably by the shafts 310, 320. The substantially cylindrical-column-shaped shafts 310, 320 are formed as guide shafts 310, 320 guiding and supporting the housing 101 of the optical pickup apparatus 1, for example. The first shaft 310 is a main shaft and the second shaft 320 is a sub-shaft.

The chassis (not shown) is disposed with a feed motor (not shown) that can move the housing 101 of the optical pickup apparatus 1. A feed screw (not shown) is disposed on and extended from the feed motor (not shown). The feed screw (not shown) is disposed in substantially parallel to the shafts 310, 320. The feed screw (not shown) is disposed in parallel in the vicinity of the first shaft 310. The feed screw is disposed with a substantially spiral feed groove (not shown) that can move the housing 101. The feed screw is mounted on a support member (not shown) attached to the chassis. A transmitting member (not shown) in contact with the feed screw is mounted on the housing 101 of the optical pickup apparatus 1. The transmitting member (not shown) is disposed with an engaging portion (not shown) to be engaged with the feed groove of the feed screw (not shown).

By rotating the feed motor, the feed screw is rotated. This rotation presses and moves the engaging portion of the transmitting member engaged with the feed grove of the feed screw on the housing 101 side, and the housing 101 of the optical pickup apparatus 1 is moved along the direction to which the substantially cylindrical-column-shaped shafts 310, 320 are extended. That is, the housing 101 of the optical pickup apparatus 1 is, as illustrated in FIGS. 1 and 2, moved along a feeding direction X1 or feeding direction X2. As a result, the housing 101 of the optical pickup apparatus 1 is moved along the radial direction of the optical disc (not shown). The housing 101 including the objective lens 110 is moved relative to the optical disc to record/reproduce data on the optical disc.

In accordance with the specification and the like of the optical disc apparatus disposed with the optical pickup apparatus (1), for example, for first shaft (310) can be linked to a feed motor that can move the housing (101) of the optical pickup apparatus (1) without disposing the feed screw. In this case, the first shaft (310) is disposed with a feed groove that can guide and move the housing (101) of the optical pickup apparatus (1).

In such an optical disc apparatus, the first shaft (310) is rotated by rotating the feed motor. This rotation presses and moves the engaging portion engaging with the feed groove of the first shaft (310) on the housing (101) side, and the housing (101) of the optical pickup apparatus (1) is moved along the direction (X1 or X2) to which the long shafts (310, 320) are extended. The components having number without parentheses constitute the optical pickup apparatus disposed with the feed screw, and the components having number in parentheses constitute the optical pickup apparatus without the feed screw. The components with the same numbers correspond to each other.

For example, a drive belt (not shown) may also be used to move the housing (101) of the optical pickup apparatus (1).

When recording/reproducing data on the optical disc, laser light emitted form a light emitting device (not shown) in the housing 101 of the optical pickup apparatus 1 passes through the objective lens 110 (FIG. 1) of the optical pickup apparatus 1 and is emitted to the outside of the optical pickup apparatus 1. The laser light is condensed by the objective lens 110 and is focused on a signal layer (not shown) of the optical disc.

When the laser light is condensed by the objective lens 110 and focused on the signal layer of the optical disc, the lens holder 111 mounted on the objective lens 110 is driven by an actuator 200 in the left, right, upward and downward directions. The definitions of "upward", "downward", "left", and "right" in this description are defined for convenience of describing the optical pickup apparatus 1.

The actuated 200 includes, for example, the lens holder 111 disposed with the objective lens 110 coils (not shown) that drive the lens holder 111 with an electromagnetic force generated by applying electric currents, a magnet (not shown) facing to the coils (not shown) and always generating the magnetic flux, and a yoke (not shown) disposed with the magnet (not shown).

As shown in FIG. 1, the optical pickup apparatus 1 includes at least the housing 101 disposed with various components 110, 111, 120, etc., for reading data/information, writing data/information, and rewriting data/information on a medium (not shown).

The housing 101 is disposed with a pair of the shafts 310, 320 supporting the housing 101 movably. A pair of the substantially cylindrical-shaped bearing portions 11, 12 is disposed on one side of the housing 101 correspondingly to the substantially round-bar-shaped first shaft 310 supporting the housing 101 movably. The substantially guide-piece-shaped bearing portion 93 is disposed on the other side of the housing 101 correspondingly to the substantially round-bar-shaped second shaft 320 supporting the housing 101 movably.

A drop test of the optical pickup apparatus 1 is performed while the shafts 310, 320 are disposed in the bearing portions 11, 12, 13 of the housing 101.

A crack generation preventing portion 16 (FIGS. 1 to 3) is disposed in the first bearing portion 11 of the housing 101 to prevent a crack from bearing generated beginning at the first bearing portion 11 in the housing 101 when the housing 101 including the shafts 310, 320 is dropped and an impact is applied to the housing 101 including the shafts 310, 320 (FIG. 2, FIG. 3).

A crack generation preventing portion 17 (FIG. 1, FIG. 2) is disposed in the second bearing portion 12 of the housing 101 to prevent crack from being generated beginning at the second bearing portion 12 in the housing 101 when the housing 101 including the shafts 310, 320 (FIG, 1) is dropped and an impact is applied to the housing 101 including the shafts 310, 320 (FIG. 1).

Therefore, the problem of the crack beginning at the bearing portions 11, 12 in the housing 101 can be prevented more easily. As described above, the "crack" means a "break" or "breach".

Since the crack generation preventing portion 16 is disposed un the bearing portion 11 of the housing 101, for example, when the optical pickup apparatus 1 is dropped with the shaft 310 disposed in the bearing portion 1 of the housing 101 and an impact is applied to the shaft 310, it can be avoided more easily that the impact is transmitted through the shaft 310 or the bearing portion 11 of the housing 101 to generate a crack beginning at the bearing portion 11 of the housing 10.

Since the crack generation preventing portion 17 is disposed in the bearing portion 12 of the housing 101, for example, when the optical pickup apparatus 1 is dropped with the shaft 310 disposed in the bearing portion 12 of the housing 101 and ann impact is applied to the shaft 310, it can be avoided more easily that the impact is transmitted through the shaft 310 to the bearing portion 12 of the housing 101 to generate a crack beginning at the bearing portion 12 of the housing 10.

Therefore, the optical disc apparatus manufacturers incorporating the optical pickup apparatus 1 into the optical disc apparatuses and the manufacturers of computers including the optical pickup apparatuses 1 can be provided with the optical pickup apparatus 1 including the crack-resistant housing 101.

As shown in FIGS. 2 to 4, the crack generation preventing portion 16 disposed in the first bearing portion 11 includes a notch portion 16c bored deeply from am outside opening 11a of the bearing portion 11 to an interior 11n of the bearing portion 11. As shown in FIG. 2, the crack generation preventing portion 17 disposed in the second bearing portion 12 includes a notch portion 17c bored from an outside opening 12a of the bearing portion 12 to an interior 12n of the bearing portion 12.

As a result, the generation of the crack from the bearing portions 11, 12 of the housing 101 can be avoided more easily. Since the notch portions for preventing crack generation 16c, 17c are bored deeply to the interiors 11n, 12n of the bearing portions 11, 12 of the housing 101, when the optical pickup apparatus 1 is dropped with the shaft 310 disposed in the bearing portions 11, 12 of the housing 101 and an impact is applied to the shaft 310, the shaft 310 contacts the deep interior 11n, 12n of the bearing portions 11, 12. Therefore, when the impact is transmitted through the shaft 310 to the bearing portions 11, 12 of the housing 101, for example, it can be avoided more easily that the shaft 310 locally contacts the outside openings 11a, 12a of the bearing portions 11, 12 of the housing 101 to crack the housing 101 from the outside openings 11a, 12a of the bearing portions 11, 12.

As shown in FIGS. 2 to 4, the crack generation preventing portion 16 disposed in the first bearing portion 11 includes the substantially conical-shaped notch portion 16c bored in a substantially funnel shape narrowed from the substantially round outside opening 11a of the bearing portion 11 to the substantially cylindrical-shaped interior 11n of the bearing portion 11. As shown in FIG. 2, the crack generation preventing portion 17 disposed in the second bearing portion 12 includes the substantially conical-shaped notch portion 17c bored in a substantially funnel shape narrowed from the substantially round outside opening 12a of the bearing portion 12 to the substantially cylindrical-shaped interior 12n of the bearing portion 12.

Since the substantially conical-shaped notch portions for preventing crack generation 16c, 17c are bored in the bearing portions 11, 12 of the housing 101 in a substantially funnel shape narrowed from the substantially round outside openings 11a, 12a of the bearing portions 11, 12 of the housing 101 to the substantially cylindrical-shaped interiors 11n, 12n of the bearing portion 11, 12 for example, when the optical pickup apparatus 1 is dropped with the substantially round-bar-shaped shaft 310 disposed in the substantially cylindrical-shaped bearing portions 11, 12 or the housing 101 and an impact is applied to the shaft 310, it can be avoided more easily that the shaft 310 locally contacts the bearing portion opening 11a, 12a of the housing 101 to make the impact force concentrated on portions of the bearing portion openings 11a, 12a of the housing 101 extraordinarily. Therefore, the problem of the crack generated from the bearing portion openings 11a, 12a an the housing 101 can be preventing more easily.

As shown in FIG. 1, the first bearing portion 11 and the second bearing portion 12 are formed to be laterally symmetrical on the upper side of the housing 101b.

The bearing portion 11 of the housing 101 includes the substantially conical-shaped notch portion 16c for preventing the generation of the crack, and a substantially cylindrical-shaped shaft slide contacting portion 11s following the substantially conical-shaped notch portion 16c and contacting the shaft 310. An inclined surface 16f of the substantially conical-shaped notch portion 16c is set to an obtuse angle relative to an internal surface 11f of the substantially cylindrical-shaped shaft slide contacting portion 11s, and the inclined surface 16f is broadened toward the outside opening 11a of the bearing portion 11. As angle ALp of the inclined surface 16f of the substantially conical-shaped notch portion 16c is set to about 169 degree relative to the internal surface 11f of the substantially cylindrical-shaped shaft slide contacting portion 11s.

If an internal shape of the bearing portion 11 of the housing 101 is formed into a shape shown in FIGS. 2 to 4, the generation of the crack can be avoided more easily at the outside opening 11a of the bearing portion 11 of the housing 101. The "obtuse angle" means an angle larger than the right angle and smaller than the straight angle. That is, the "obtuse angle" means an angle larger than 90 degrees and smaller than 180 degrees. Since the inclined surface 16f of the substantially conical-shaped notch portion for preventing crack generation 16c is set to an obtuse angle relative to the internal surface 11f of the shaft slide contacting portion 11s of the bearing portion 11 (FIG. 4) and the inclined surface 16f of the notch portion for preventing crack generation 16c is broadened toward the outside opening 11a of the bearing portion 11, when the optical pickup apparatus 1 is dropped with the substantially round-bar-shaped shaft 310 disposed in the substantially cylindrical-shaped bearing portion 11 of the housing 101 and an impact is applied to the shaft 310, for example, is can be avoided more easily that the shaft 310 locally contacts the outside opening 11a of the bearing portion 11 of the housing 101 to make the impact force concentrated on the outside opening 11a of the bearing portion 11 of the housing 101 extraordinarily. Therefore, the problem of the crack generated from the outside opening 11a of the bearing portion 11 in the housing 101 can be prevented more easily.

For example, the substantially conical-shaped notch portion 16c is formed into a flat-screw-shaped countersunk hole depending on the angle ALp of the substantially conical-shaped inclined surface 16f. For example, the substantially conical-shaped notch portion 16c is formed into a flat-screw-shaped countersunk hole from the substantially round outside opening 11a of the bearing portion 11 of the substantially cylindrical-shaped interior 11n of the bearing portion 11 depending on the angle ALp of the substantially conical-shaped inclined surface 16f.

The angle ALp of the inclined surface 16f of the substantially conical-shaped notch portion 16c is set to, for example, about 130 degree or more and about 170 degrees or less relative to the internal surface 12f of the substantially cylindrical-shaped shaft slide contacting portion 11s. If the angle ALp is smaller than 130 degrees, when the shaft 310 is applied to a stress alleviating portion 16r between the substantially conical-shaped portion 16c and a substantially cylindrical-shaped shaft slide contacting portion 11s following the substantially conical-shaped notch portion 16c, the force tends to concentrate on the stress alleviating portion 16r. If the angle ALp is larger than 170 degrees, a difference is reduced between the diameter Da of the substantially round outside opening 11a, and the diameter Db of the substantially cylindrical-shaped shaft slide contacting portion 11s, and it is difficult for the notch portion 16c to act as the crack generation preventing portion 16c. Therefore, it is preferable to set the angle ALp to about 165 degree, for example.

When the shaft 310 is inserted into the shaft slide contacting hole 11s of the bearing portion 11 disposed on the housing 101, a gap CL (FIG, 3), i.e., so-called clearance is formed between the shaft slide contacting hole 11s of the bearing portion 11 and the shaft 310. A depth dimension LC of the notch portion 16c (FIG. 3, FIG. 4) is set larger than a clearance dimension CL between the shaft slide contacting hole 11s of the bearing portion 11 and the shaft 310 (FIG. 3).

Therefore, it can be avoided more easily that the crack is generated from the opening 11a of the bearing portion 11 of the housing 101. Since the depth dimension Lc of the notch portion for preventing crack generation 16c disposed in the bearing portion 11 of the housing 101 is set larger than the clearance dimension CL between the shaft slide contacting hole 11s of the bearing portion 11 and the shaft 310, for example, when the optical pickup apparatus 1 is dropped with the shaft 310 disposed in the bearing portion 11 of the housing 101 and an impact is applied to the shaft 310, the shaft 310 contacts a relatively deep part of the interior 11n of the bearing portion 11. Since the shaft 310 contacts a relatively deep part of the interior 11n of the bearing portion 11, when an impact is transmitted through the shaft 310 to the bearing portion 11 of the housing 101, for example, a problem is prevented more easily that the shaft 310 locally contacts the opening 1a of the bearing portion 11 of the housing 101 which results in a crack of the housing 101 from the opening 11a of the bearing portion 11.

The diameter Db (FIG. 4) of the shaft slide contacting hole 1s of the bearing portion 11 is 3.002 to 3.012 mm (millimeters), for example. The diameter Ds of the shaft 310 (FIG. 3) is 2.980 to 3.000 mm, for example. Therefore, the clearance dimension CL between the shaft slide contacting hole 11s of the bearing portion 11 and the shaft 310 is 0.002 to 0.032 mm. The depth dimension Lc of the notch portion 16c is about 2 mm.

The depth Lc of the notch portion 16c is preferably set to one-fifth or more of the width Lw of the bearing portion 11 and four-fifth or less of the width Lw of the bearing portion 11. Specifically, the depth Lc of the portion 16c is preferably set to a half or less of the width Lw of the bearing portion 11.

When the depth Lc of the notch portion 16c is set to a small value less than one-fifth of the width Lw of the bearing portion 11, the depth Lc of the notch portion 16c is reduced and it is concerned that the notch portion 16c does not act as the notch portion 16c for preventing the generation of the crack. When the depth Lc of the notch portion 16c is set to a large value that greater than four-fifths of the width Lw of the bearing portion 11, the depth Lc of the notch portion 16c is too large and it is concerned that the widthwise length La of the shaft slide contacting portion 11s of the bearing portion 11 becomes too short.

For example, if the depth dimension Lc of he notch portion 16c is set to about one-fourth of the width dimension Lw of the bearing portion 11, the widthwise length La of the shaft slide contacting portion 11s of the bearing portion 11 does not become too short, and the notch portion for preventing crack generation 16c width an appropriate depth Lc is formed in the bearing portion 11. The width dimension Lw of the bearing portion 11 is about 7.8 mm. The depth dimension Lc of the notch portion 16c is about 2 mm.

In accordance with the design/specification of the optical pickup apparatus (1), for example, the depth dimension (Lc) of the notch portion (16c) can be set to about 3.8 mm (not shown), which is about a half of the width (Lw) of the bearing portion (11)). If the depth Lc of the notch portion 16c is set to a half or less (about 3.9 mm or less) of the width Lw of the bearing portion 11, the widthwise length La of the shaft slide contacting portion 11s of the bearing portion 11 is ensured sufficiently. Preferably, the widthwise length La of the shaft slide contacting portion 11s of the bearing portion 11 is ensured to be. for example, 1 mm or more.

As shown in FIG. 2, S1 and S2 are defined as cross-section areas when the first bearing portion 11 is divided exactly into halves, and S3 and S4 are defined as cross-section areas when the second bearing portion 12 is divided exactly into halves. A total area S is defined as the sum of the cross-section areas S1, S2, S3, and S4. When W, G, and σ are defined as a weight of the pickup apparatus 1, allowed acceleration, and allowable stress of the material forming the housing 101, respectively, the total cross-section area S of the bearing portion 11, 12 is set based on the following equation (1)

$$S > [(W \times G)/\sigma] \tag{1}$$

By setting the total area S of the first bearing portion 11 and the second bearing portion 12 of the housing 101 based on the equation (1), if an impact is applied to the housing 101, it is avoided that the bearing portion 11, 12 disposed on the housing is cracked.

As shown in FIGS. 2 and 3, the crack generation preventing portion 16 is disposed with the stress alleviating portion 16r (FIG. 3, FIG. 4) that alleviates an impact force applied to the bearing portion 11 because the long shaft 310 is elastically deformed considerably for a moment and hits against the bearing portion 11 of the housing 101 when the housing 101 including the shaft 310 is dropped and at impact is applied to the housing 101 including the shaft 310.

Therefore, a problem can be prevented more easily that a crack is generated in the housing 101. For example, when the optical pickup apparatus 1 is dropped with the long shaft 310 disposed in the bearing portion 11 of the housing 101 and an impact is applied to the long shaft 310, if the impact is transmitted through the long shaft 310 to the bearing portion 11 of the housing 101, the impact is alleviated by the stress alleviating portion, for preventing crack generation for disposed in the bearing portion 11 of the housing 101. Therefore, a problem can be prevented more easily that the impact is transmitted through the long shaft 310 to the bearing portion 11 of the housing 101 to crack the housing 101 from the bearing portion 11.

As shown in FIG. 4, the stress alleviating portion 16r of the crack generation preventing portion 16r is disposed between the substantially conical-shaped notch portion 16c and the substantially cylindrical-shaped shaft slide contacting portion 11s following the substantially conical-shaped notch portion 16c and contacting the substantially round-bar-shaped shaft 310.

The impact applied to the shaft 310 is alleviated by the stress alleviating portion for preventing crack generation 16r between the substantially conical-shaped notch portion 16c disposed in the substantially round-hole-shaped bearing portion 11 of housing 101 and the substantially cylindrical-shaped shaft slide contacting portion 11s following the notch portion 16c and contacting the substantially round-bar-shaped shaft 310. Therefore, the bearing portion 11 of the housing 101 becomes hard to be cracked.

The stress alleviating portion 16r of the crack generation preventing portion 16r is formed in the bearing portion 11 as a curved surface 16r with a small curvature radius linking the substantially conical-shaped notch portion 16c and the substantially cylindrical-shaped shaft slide contacting portion 11s smoothly.

Therefore, a problem can be avoided more easily that the crack is generated in the housing 101. If the stress alleviating portion 16r is formed in the bearing portion 11 as the curved surface 16r with a small curvature radius to alleviate the impact force applied to the bearing portion 11 because the long shaft 310 hits against the bearing portion 11, stress concentration is hard to be generated in the bearing portion 11. The "stress concentration" means a state of highly localized stress distribution, for example. Since the stress concentration can be avoided more easily in the bearing portion 11, the crack beginning at the bearing portion 11 of the housing 101 can be avoided more easily.

The curved surface 16r of the crack generation preventing portion 16 is formed into a minute R-chamfered shape. The "chamfering" is to make a slope at or round off a corner of intersecting surface, for example. The R-chamfering is to round off a corner, for example. For example, the curved surface 16r of the crack generating portion 16 may be formed into a minute C-chamfered shape. The C-chamfering is to make a slope at a corner, for example.

As shown in FIGS. 1 and 2, a pair of the bearing portions 11, 12 is disposed on a main body 101b of the housing 101 for one shaft 310. The crack generation preventing portions 16, 17 are formed on both outside portions 11w, 12w of a pair of the adjacent bearing portions 11, 12.

Therefore, the crack beginning at the bearing portions 11, 12 of the housing 101 is avoided more easily. For example, when an impact is applied to the shaft 310 while one long shaft 310 is included in a pair of the bearing portions 11, 12 disposed on the housing 101, the long shaft 310 may be bent considerably for a moment (FIG. 2). In this case, it is concerned that the long shaft 310 may contact bearing portion openings disposed in the both outside portions 11w, 12w of a pair of the adjacent bearing portions 11, 12.

If a pair of the bearing portions 11, 12 is disposed on the housing 101, the impact transmitted through the long shaft 310 to the housing 101 disperses to a pair of the bearing portions 11, 12. If the crack generation preventing portions 16, 17 are formed on the both outside portions 11w, 12w of a pair of the adjacent bearing portions 11, 12, the generation of the crack is avoided more easily which begins at one or both of the outside portions 11w, 12w of a pair of the bearing portions 11, 12. Therefore, the housing 101 constituting the optical pickup apparatus 1 becomes harder to be cracked.

In accordance with the design/specification of the optical pickup apparatus 1, for example, the crack generation preventing portions 16, 17 may be formed at the both outside openings 11a, 12a of a pair of the bearing portions 11, 12 and at the both inside openings 11b, 12b (FIG. 2) of a pair of the bearing portions 11, 12.

As shown in FIG. 1, the first shaft 310 and the second shaft 320 are formed into a substantially round-bar-shaped elongated shape.

The first between portion 11 of the housing 101 is formed into a substantially round hole shape and has substantially round openings 11a, 11b. The crack generation preventing portion 16 has the substantially round-hole-shaped notch portion 16c formed from the substantially round outside opening 11a of the first bearing portion 11 to the substantially cylindrical-shaped interior 11n of the bearing portion 11. The outside opening 11a of the substantially round-hole-shaped first bearing portion 1 is formed to act also as the opening 11a of the substantially round-hole shaped notch portion 16c.

When the substantially round-bar-shaped long shaft 310 is disposed in the substantially round-hole-shaped first bearing portion 11 of the housing 101, a surface 310f of the substantially round-bar-shaped shaft 310 does not contact the substantially round outside opening 11a of the substantially round-hole-shaped notch portion 16c disposed in the substantially round-hole-shaped first bearing portion 11.

The second bearing portion 12 of the housing 101 is formed into a substantially round hole shape and has the substantially round openings 12a, 12b. The crack generation preventing portion 17 has the substantially round-hole-shaped notch portion 17c formed from the substantially round outside opening 12a of the second bearing portion 12 to the substantially cylindrical-shaped interior 12n of the bearing portion 12. The outside opening 12a of the substantially round-hole-shaped second bearing portion 12 is formed to act also as the opening 12a of the substantially round-hole-shaped notch portion 17c.

When the substantially round-bar-shaped long shaft 310 is disposed in the substantially round-hole-shaped second bearing portion 12 of the housing 101, the surface 310f of the substantially round-bar-shaped shaft 310 does not contact the substantially round outside opening 12a of the substantially round-hole-shaped notch portion 17c disposed in the substantially round-hole-shaped second bearing portion 12.

Therefore, it is avoided that the outside opening 11a, 12a of the bearing portions 11, 12 of the housing 101 act as a beginning point of a crack and that the housing 101 is cracked from the outside opening 11a, 12a of the bearing portions 11, 12. When the substantially round-bar-shaped long shaft 310 is disposed int he substantially round-hole-shaped bearing portions 11, 12 of the housing 101, the surface 310f of the substantially round-bar-shaped 310 does not contact the substantially round outside openings 11a, 12a of the substantially round-hole-shaped notch portions 16c, 17c disposed in the substantially round-hole-shaped bearing portions 11, 12 and, therefore, when an impact is transmitted through the substantially round-bar-shaped shaft 310 to the housing 101, it is avoided that the housing is cracked from the substantially round outside openings 11a, 12a, of the substantially round-hole-shaped bearing portions 11, 12 of the housing 101.

For example, when the optical pickup apparatus 1 is dropped with the substantially round-bar-shaped long shaft 310 disposed in the substantially round-hole-shaped bearing portions 11, 12 of the housing 101 and an impact is applied to the substantially round-bar-shaped shaft 310, it is avoided that the impact is transmitted through the substantially round-bar-shaped long shaft 310 to the substantially round outside openings 11a, 12a of the substantially round-hole-shaped bearing portions 11, 12 of the housing 101 to generate a crack in the housing 101 beginning at the substantially round outside openings 11a, 12a of the substantially round-hole-shaped bearing portions 11, 12.

The housing 10 is made of heat-resistant thermoplastic synthetic resin material that can be injection-molded.

As a result, the optical pickup apparatus 1 is configured with housing 101 having a lighter weight. In general, a specific gravity of resin material is smaller than that of metal material. Therefore, the weight of the housing 101 can be reduced by forming the housing 101 with the use of a resin material. Since the crack generation preventing portions 16, 17 are disposed in the bearing portions 11, 12 of the synthetic resin housing 101, it can be avoided more easily that the housing 101 is cracked from the bearing portions 11, 12. Therefore, the optical disc apparatus manufacturers incorporating the optical pickup apparatuses 1 into the optical disc apparatus and the manufacturers of computers including the optical pickup apparatus 1 can be provided with the optical pickup apparatus 1 including the synthetic resin housing 101 with a lighter weight, which is hard to be cracked from the bearing portions 11, 12.

With regard to the thermoplastic and heat-resistant synthetic resin material that can be injection-molded, the material includes, for example, polyarylene sulfide resin such as polyphenylene sulfide (PPS), which is excellent in heat stability, electric characteristics, and dimensional stability. For example, PPS is used as a base material in DIC (registered trade mark) of Dainippen Ink And Chemicals, Inc. Specifically, PPS includes, for example, DIC·PPS_FZ-2100 of Dainippon Ink And Chemicals, Inc.

As described above, the housing 101 is formed based on the injection molding with the use of the base material of synthetic polymer such as PPS. Since the housing 101 is formed based on the injection molding, for example, even when the housing 101 has a complex shape shown in FIGS. 1 and 2, the housing 101 can be produced in high volume efficiently. Since the injection molding is performed, the bearing portions 11, 12, 93 are formed integrally with the housing body 101b. The housing body 101b and the bearing portions 11, 12, 93 (FIG. 1) are made of the same synthetic resin material.

The shafts 310, 320 included in the optical pickup apparatus 1 are made of a metal material. Stainless steel excellent in corrosion resistance is used for the metal material. Stainless steel includes SUS301, SUS302, and SUS 304, for example.

Since the shafts 310, 320 are made of stainless steel, a problem is avoided that the housing 101 of the optical pickup apparatus 1 cannot accurately on the shafts 310, 320 because the shafts 310, 320 are corroded considerably, for example, and rust is generated due to the corrosion of the shafts 310, 320, for example.

Since the optical disc apparatus including the optical pickup apparatus 1 is assembled by mounting the shafts 310, 320 (FIG. 1) on the optical pickup apparatus 1 including the housing 101 and by mounting the shaft 310, 320 on the chassis (not shown) of the optical disc apparatus (not shown).

As a result, the optical disc apparatus including the optical pickup apparatus 1 is configured with measures against the crack of the housing 101. For example, when the optical disc apparatus is dropped and an impact is applied to the optical disc apparatus, the problem of the crack can be prevented more easily in the housing 101 of the optical pickup apparatus 1 included in the optical disc apparatus. Therefore, the computer manufacturers, etc., incorporating the optical disc apparatuses into computers can be provided with the optical disc apparatus including the impact-resistant optical pickup apparatus 1.

The optical disc apparatus (not shown) including the optical pickup apparatus 1 can be mounted on a computer such as a notebook-sized personal computer (not shown), laptop personal computer (not shown)m and desktop personal computer (not shown), an device such as a CD player, and an audio/visual device (not shown) such as a DVD player, for example.

The pickup apparatus of the present invention and the disc apparatus including the same are not limited to the shown apparatuses. For example, the present invention may be applied to the pickup apparatus supporting the optical disc of the "Blu-ray Disc" series. The present invention can be changed variously without departing from the gist thereof.

What is claimed is:

1. A pickup apparatus comprising
    a housing equipped with components for reading data on a medium,
    the housing being disposed with a bearing portion correspondingly to a shaft member supporting the housing movably,
    the bearing portion being disposed with a crack generation preventing portion that prevents the housing from becoming cracked when an impact is applied to the housing with the shaft member disposed in the bearing portion,
    wherein the crack generation preventing portion includes a notch portion bored deeply toward an interior of the bearing portion.

2. The pickup apparatus of claim 1, wherein the notch portion comprises a substantially conical shape which is bored while being narrowed toward the interior of the bearing portion.

3. The pickup apparatus of claim 1,
    wherein the notch portion comprises a substantially conical shape which is bored while being narrowed toward the interior of the bearing portion,
    wherein the bearing portion includes:
        the notch portion; and
        a shaft slide contacting portion in a substantially cylindrical shape following the notch portion and contacting the shaft member, and
    wherein an inclined surface of the notch portion is set to form an obtuse angle relative to an internal surface of the shaft slide contacting portion, the inclined surface being broadened toward an opening of the bearing portion.

4. The pickup apparatus of claim 1,
    wherein the notch portion is bored deeply from an opening of the bearing portion to the interior of the bearing portion, and
    wherein when the shaft member is inserted in the bearing portion, clearance is formed between the bearing portion and the shaft member, a depth dimension of the notch portion being set greater than a clearance dimension between the bearing portion and the shaft member.

5. The pickup apparatus of claim 1, wherein the crack generation preventing portion is disposed with a stress alleviating portion that, when an impact is applied to the housing including the shaft member, alleviates an impact force to be received by the bearing portion by virtue of the shaft member's hitting against the bearing portion.

6. The pickup apparatus of claim 5, wherein the stress alleviating portion is formed as a curved surface.

7. The pickup apparatus of claim 1,
    wherein the notch portion comprises a substantially conical shape which is formed to be narrowed toward the interior of the bearing portion in a substantially round hole shape, and
    wherein between the notch portion in a substantially conical shape and the shaft slide contacting portion in a substantially cylindrical shape following the notch portion and contacting the shaft member, is disposed a stress alleviating portion that, when an impact is applied to the housing including the shaft member in a substantially round bar shape, alleviates an impact force to be received by the bearing portion by virtue of the shaft member's hitting against the bearing portion.

8. The pickup apparatus of claim 1, wherein a pair of the bearing portions is disposed on the housing and the crack generation preventing portions are formed on both outside portions of a pair of the bearing portions adjacent to each other.

9. The pickup apparatus of claim 1,
    wherein the shaft member is formed into a substantially round bar shape, wherein the bearing portion is formed into a substantially round hole shape to have an opening in a substantially round shape,
    wherein the notch portion is formed from the opening of the bearing portion to the interior of the bearing portion,
    wherein the opening of the bearing portion is formed to serve also as an opening of the notch portion, and
    wherein when the shaft member is disposed in the bearing portion, a surface of the shaft member does not contact the opening.

10. The pickup apparatus of claim 1, wherein the housing is made of a resin material.

11. A disc apparatus comprising the pickup apparatus of claim 1.

* * * * *

UNITED STATES PATENT AND TRADEMARK OFFICE
CERTIFICATE OF CORRECTION

PATENT NO. : 7,610,592 B2 Page 1 of 1
APPLICATION NO. : 11/465301
DATED : October 27, 2009
INVENTOR(S) : Yasufumi Yamagishi et al.

It is certified that error appears in the above-identified patent and that said Letters Patent is hereby corrected as shown below:

On the title page, item [57]: the Abstract, line 4, change "movable" to -- movably --;
On the title page, column 2, item [57]: the Abstract, line 6, change "preventing" to -- prevents --.

Column 1, line 6, change "Sep. 12, 2003" to -- Sep. 12, 2005 --.

Signed and Sealed this

Sixth Day of July, 2010

David J. Kappos
*Director of the United States Patent and Trademark Office*